US 6,658,266 B1

(12) United States Patent
Inokura et al.

(10) Patent No.: US 6,658,266 B1
(45) Date of Patent: Dec. 2, 2003

(54) MOBILE RADIO APPARATUS AND CONTROL CIRCUIT THEREOF

(75) Inventors: Hamami Inokura, Hachioji (JP); Michiaki Okano, Yokohama (JP); Katsuhiko Kuma, Yokohama (JP)

(73) Assignee: Kabushiki Kaisha Toshiba, Kawasak (JP)

( * ) Notice: Subject to any disclaimer, the term of this patent is extended or adjusted under 35 U.S.C. 154(b) by 448 days.

(21) Appl. No.: 09/657,626

(22) Filed: Sep. 8, 2000

(30) Foreign Application Priority Data

Sep. 10, 1999 (JP) .......................................... 11-257599

(51) Int. Cl.7 .............................. H04B 1/38; H04M 1/00
(52) U.S. Cl. ................................ 455/553.1; 455/414.1
(58) Field of Search ................................ 455/414, 415, 455/416, 417, 552, 553, 423, 466, 414.1, 412.1, 412.2, 553.1

(56) References Cited

U.S. PATENT DOCUMENTS 5,519,508 A * 5/1996 Murayama .................. 358/436
6,009,325 A * 12/1999 Retzer et al. ............... 455/434
6,317,607 B1 * 11/2001 Tomcik et al. .............. 455/552
6,473,422 B2 * 10/2002 Hall et al. .................. 370/352

FOREIGN PATENT DOCUMENTS

JP         9-252486         9/1997

OTHER PUBLICATIONS

JPO, Japanese Application No. 257599/99, "Notification of Reasons for Rejection," mailing date Apr. 1, 2003, 2 pages, with English translation (3 pages).

* cited by examiner

Primary Examiner—Edward F. Urban
Assistant Examiner—Simon Nguyen
(74) Attorney, Agent, or Firm—Finnegan, Henderson, Farabow, Garrett & Dunner, L.L.P.

(57) ABSTRACT

In the present invention, when there is incoming voice call notification from the network in an active state (i.e. in a period in which the packet data is actually transmitted and received and in a period passing until the time when clocking interval time T0 is finished) while a line for packet transmission is held, incoming-call-in-packet-transmission controlling means makes a response of rejecting the incoming voice call. When there is incoming voice call notification in a standby state (i.e. in a period other than the periods of the active state), the incoming-call-in-packet-transmission controlling means makes a response of receiving the incoming voice call.

8 Claims, 6 Drawing Sheets

| COMMUNICATION PROTOCOL | INCOMING CALL PROCESS SETTING |
|---|---|
| SVC | RECEIVE |
| PVC | NOT RECEIVE |

FIG. 6

| NUMBER OF SELECTIVELY SIMULTANEOUS VIRTUAL CIRCUIT CONNECTION | INCOMING CALL PROCESS SETTING |
|---|---|
| SMALLER THAN 3 | RECEIVE |
| LARGER THAN 4 | NOT RECEIVE |

FIG. 7

| CONNECTION DESTINATION ID CODE | INCOMING CALL PROCESS SETTING |
|---|---|
| OTHER THAN 1112222 | RECEIVE |
| 1112222 | NOT RECEIVE |

FIG. 8

| PACKET TRANSMISSION DURATION EQUAL TO OR | INCOMING CALL PROCESS SETTING |
|---|---|
| LONGER THAN 20 MIN. | RECEIVE |
| SHORTER THAN 20 MIN. | NOT RECEIVE |

FIG. 9

MOBILE RADIO APPARATUS AND CONTROL CIRCUIT THEREOF

CROSS-REFERENCE TO RELATED APPLICATIONS

This application is based upon and claims the benefit of priority from the prior Japanese Patent Application No. 11-257599, filed Sep. 10, 1999, the entire contents of which are incorporated herein by reference.

BACKGROUND OF THE INVENTION

The present invention relates to a terminal apparatus of, for example, a mobile telephone system and a portable telephone system, and particularly to a mobile radio apparatus capable of transmission and reception of packet data and a control circuit thereof.

Mobile telephones and portable telephones have come into wide use recently, and a demand for the data communications utilizing not only the voice communication, but also the character communication has increased.

In addition, the environment of contents service using browsers has been improved by the packet switching service and the mobile communication terminals having a packet transmission function have spread to use the service.

In the packet transmission network of the early type, when there is an incoming call during the packet transmission, the telephone only rings for a certain time to notify the incoming call, and no response to the incoming call could be made. These days, however, functions have been added to the network to respond to the incoming voice call even during the packet transmission.

There are incoming voice call systems 1 and 2 for notification of the incoming voice call. In both systems, the function "RECEIVE"/"NOT RECEIVE" about the incoming voice call during the packet transmission is set in advance. If the incoming voice call is received while "RECEIVE" is set, the packet transmission is automatically stopped to shift to the incoming voice call. If the incoming voice call is received while "NOT RECEIVE" is set, the telephone rejects the incoming voice call and continues the packet transmission.

In the incoming voice call system 2, when the incoming voice call is notified, the user can selectively execute continuing the packet transmission or receiving the incoming voice call after finishing the pact transmission, by operating keys and the like.

However, if the call is received during the packet transmission when "RECEIVE" is set, the telephone responds to the incoming voice call even in an active state in which the packet data is transferred and, therefore, the transferred packet data may be invalid.

In addition, when "NOT RECEIVE" is set, even if the telephone is kept in the standby state in which the packet data is not actually transmitted or received, the telephone keeps holding the line without receiving the incoming voice call. Therefore a problem arises that the use efficiency of the line may be deteriorated.

BRIEF SUMMARY OF THE INVENTION

The object of the present invention is to provide a mobile radio apparatus which allows the efficiency of use of a line to be improved in response to incoming voice call while efficiently transmitting and receiving packet data even in the packet transmission and a control circuit of the mobile radio apparatus.

To achieve the above object, there is provided a mobile radio apparatus for establishing a communication link with a radio base station which can be connected to a network and making communications of packet data via the radio communication link and a control circuit of the mobile radio apparatus. The terminal apparatus comprises communication state discriminating means for detecting an end of transfer of the packet data, and incoming call responding means, in a case where an incoming voice call signal is received via the radio base station after a preset time has passed since the time when the end of the transfer of the packet data is detected by the communication state discriminating means for detecting an end of transfer of the packet data, for making a response of receiving the incoming signal.

In the above-constituted mobile radio apparatus and the control circuit thereof, if there is an incoming voice call after a predetermined time has passed when the transfer of the packet data has been actually finished, an incoming signal for the incoming voice call is received.

Therefore, according to the mobile radio apparatus and the control circuit thereof, the efficiency of use of a line can be improved in response to the incoming voice call while efficiently transmitting and receiving packet data even in the packet transmission.

In addition, to achieve the above object, there is also provided a mobile radio apparatus for establishing a communication link with a radio base station which can be connected to a network and making communications of packet data via the radio communication link, and a control circuit of the mobile radio apparatus, and the terminal apparatus comprises total data amount detecting means for detecting a total amount of the packet data that is to be transferred, data amount detecting means for detecting an amount of the packet data that has been transferred, during the transfer of the packet data, and incoming call responding means, in a case where the data amount detected by the data amount detecting means is smaller than a preset rate as compared with the total data amount detected by the total data amount detecting means when an incoming voice call signal is received via the radio base station, for making a response of receiving the incoming signal.

Further, there is provided a mobile radio apparatus for establishing a communication link with a radio base station which can be connected to a network and making communications of packet data via the radio communication link and a control circuit of the mobile radio apparatus, and the terminal apparatus comprises total data amount detecting means for detecting a total amount of the packet data that is to be transferred, data amount detecting means for detecting an amount of the packet data that has been transferred, during the transfer of the packet data and incoming call responding means, in a case where the data amount detected by the data amount detecting means is equal to or larger than a preset rate as compared with the total data amount detected by the total data amount detecting means when an incoming voice call signal is received via the radio base station, for making a response of rejecting the incoming signal.

In the above-constituted mobile radio apparatus and the control circuit thereof, the incoming voice call is received when the rate of the packet data that has been transferred to the total data amount of the packet data that is to be transferred is smaller than a preset value, and the incoming call is rejected when the rate is equal to or larger than the preset value.

Thus, according to the mobile radio apparatus and the control circuit thereof, the incoming voice call is received at the initial stage of communication at which the substantial transfer amount of the packet data is small, and the incoming voice call is rejected when the communication proceeds and the substantial transfer amount of the packet data is larger. Therefore, the efficiency of use of the line can be improved in response to the incoming voice call while efficiently transmitting and receiving the packet data even in the packet transmission.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
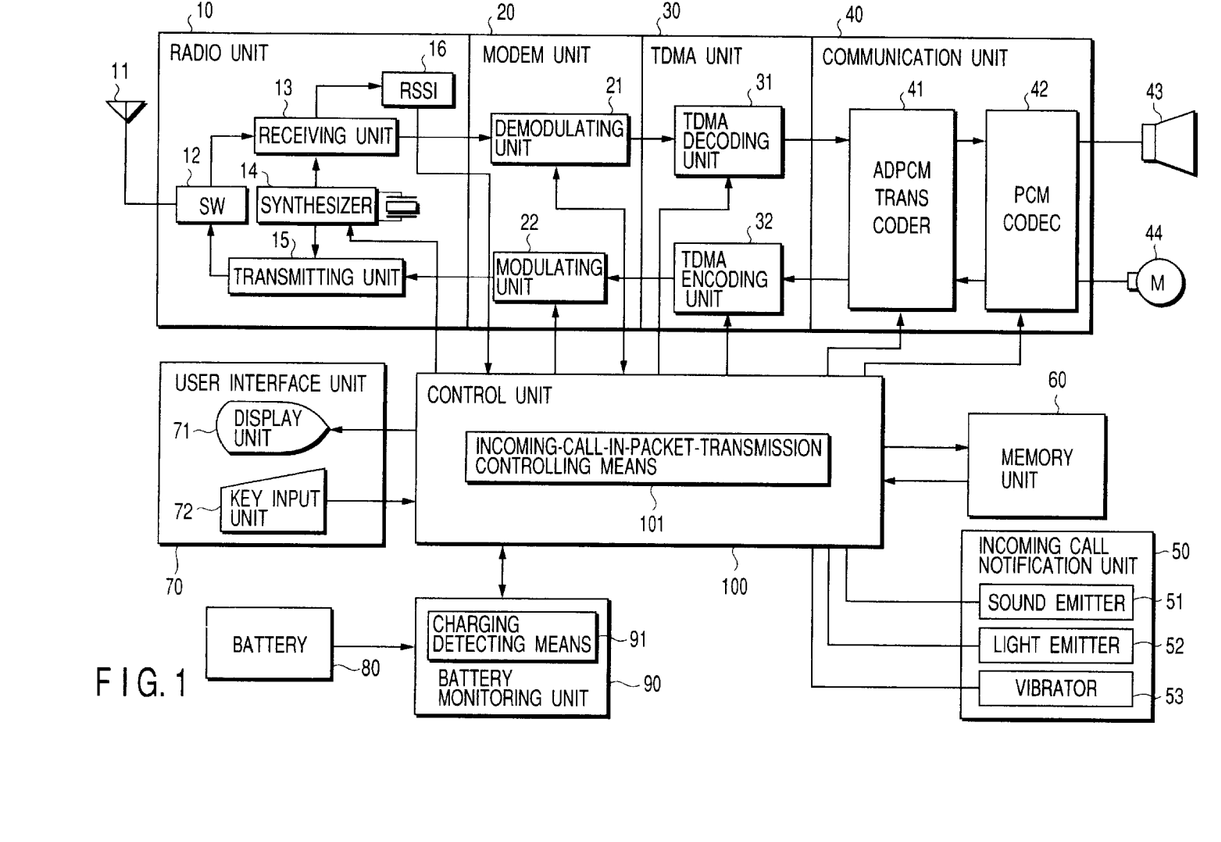
FIG. 1 is a block diagram of a mobile radio apparatus according to a first embodiment of the present invention.

The mobile radio apparatus according to a first embodiment of the present invention will be explained below with reference to the drawings. The PDC (Personal Digital Cellar) mobile radio apparatus of the TDMA (Time Division Multiple Access) system will be exemplified here. FIG. 1 shows a configuration thereof.

The mobile radio apparatus comprises a radio unit 10 having an antenna 11, a modem unit 20, a TDMA unit 30, a communication unit 40 having a loud-speaker 43 and a microphone 44 (M), an incoming call notification unit 50, a memory unit 60, a user interface unit 70, a battery 80, a battery monitoring unit 90 and a control unit 100.

A radio frequency signal transmitted from a radio station via a radio communication channel is received by an antenna 11 and then input to a receiving unit 13 via a radio-frequency switch (SW) 12 of the radio unit 10.

In the receiving unit 13, the radio frequency signal is mixed with a receiving local oscillation signal generated from a frequency synthesizer 14 and then frequency-converted into a receiving intermediate frequency signal.

The local oscillation frequency generated from the frequency synthesizer 14 is instructed by the control unit 100 in accordance with the radio channel frequency. A receiving field strength detecting unit (RSSI) 16 is provided in the radio unit 10. In the RSSI 16, the receiving field strength of the radio frequency signal arriving from the radio station is detected and a detection value thereof is notified to the control unit 100.

The receiving intermediate frequency signal that is output from the receiving unit 13 is input to a demodulating unit 21 of the modem unit 20. In the demodulating unit 21, the receiving intermediate frequency signal is digitally demodulated and a digital communication signal is thereby reproduced.

In a TDMA decoder unit 31 of the TDMA unit 30, the digital communication signal is divided by a time slot in accordance with an instruction of the control unit 100. The digital communication signal of the slot for the own terminal apparatus, of a plurality of divided digital communication signals, is input to the communication unit 40.

The communication unit 40 has an adaptive delta PCM trans-coder (ADPCM TRANS CODER) 41 and a PCM codec (PCM CODEC) 42. The digital communication signal is decoded by the ADPCM TRANS CODER 41 and the PCM CODEC 42 in sequence, and reproduced as an analog communication signal. The analog communication signal is amplified by a communication amplifier (not shown) and is output from the loud-speaker 43.

On the other hand, the transmitted voice that is input to the microphone 44 is encoded by the PCM CODEC 42 and the ADPCM TRANS CODER 41 in sequence as a digital communication signal, which is input to a TDMA encoding unit 32.

In the TDMA encoding unit 32, the digital communication signal that is output from the ADPCM TRANS CODER 41 is inserted into a time slot instructed by the control unit 100 and is input to a modulating unit 22. In the modulating unit 22, a carrier wave signal is digitally modulated in accordance with the digital communication signal. The carrier wave signal thus modulated is input to a transmitting unit 15.

In the transmitting unit 15, the modulated carrier wave signal is mixed with the transmission local oscillation signal generated from the frequency synthesizer 14. The signal is therefore frequency-converted into a radio channel frequency instructed by the controlling unit 100 and is amplified to a predetermined transmission power level. The radio frequency signal frequency-converted and amplified in the transmitting unit 15 is transmitted from the antenna 11 to the radio base station via the radio-frequency switch 12.

When the call is received at the terminal apparatus, the incoming call notification unit 50 notifies the incoming call under the control of the control unit 100 to the user. The incoming call notification unit 50 comprises a sound generator 51 for notifying the incoming call by emitting an audible tone, a light generator 52 for notifying the incoming call by emitting light and a vibrator 53 for notifying the incoming call by generating vibration by, for example, an eccentric motor.

The memory unit 60 has a semiconductor memory such as ROM and RAM as its storage medium. The storage medium the ID data of the own terminal apparatus that is necessary for the control program of the control unit 100 and the authentication, various control data, various setting data, and dial data corresponding to abbreviated dialing numbers.

The user interface unit 70 comprises a display unit 71 and a key input unit 72. The display unit 71, composed of, for example, LCD (Liquid Crystal Display), visually displays the conditions (i.e. the incoming/outgoing call, the remaining power of battery and the reception strength) of the own terminal apparatus and the dial data which is read from the memory unit 60 to the user.

The key input unit 72 comprises keys for executing general functions about the incoming/outgoing call such as a ten-key keyboard for inputting dial numbers, and function setting keys for various setting such as the switching of an incoming call notification method (audible tone/light/vibrator/no notification).

The battery 80 is composed of a secondary battery such as a lithium-ion battery, a nickel metal hydride (NiMH) battery and the like and serves as a power source for driving the terminal apparatus. The battery, which monitors unit 90 monitors the battery 80, comprises a function of detecting the remaining power of the battery and notify it to the control unit 100 and also charging detecting means 91 for detecting whether the battery 80 is being charged or not.

The control unit 100 includes, for example, a microcomputer as its main control part and executes general control such as the control about the transmission and reception as described above, the control of changing and setting the above-described incoming call notification method, and the like. The control unit 100 also comprises incoming-call-in-packet-transmission controlling means 101 as a new control function.

The incoming-call-in-packet-transmission controlling means 101 makes a response of rejecting the incoming voice call, in the active state, and a response of receiving the incoming voice call, in the standby state, when the incoming voice call is notified from the network, under the condition that the line for the packet transmission is held.

The active state is a mixture of a period in which the packet data is actually transmitted and received, with a period in which a standby shifting timer counts the state of transferring no packet in interval time T0 after the transmission and reception of the packet data has finished. The standby state is a period other than the period in the active state. In the mobile radio apparatus, the interval time T0 is often set at the network side.

Next, operations of the mobile radio apparatus constituted as described above will be explained. The operations about the incoming and outgoing call for the voice communication and packet transmission are the same as those in the prior art and, therefore, an explanation thereof will be omitted.

Particularly, an example of control operations in a case where the incoming voice call is received during the packet transmission, executed by the incoming-call-in-packet-transmission controlling means 101 will be explained below.

Figure 2:
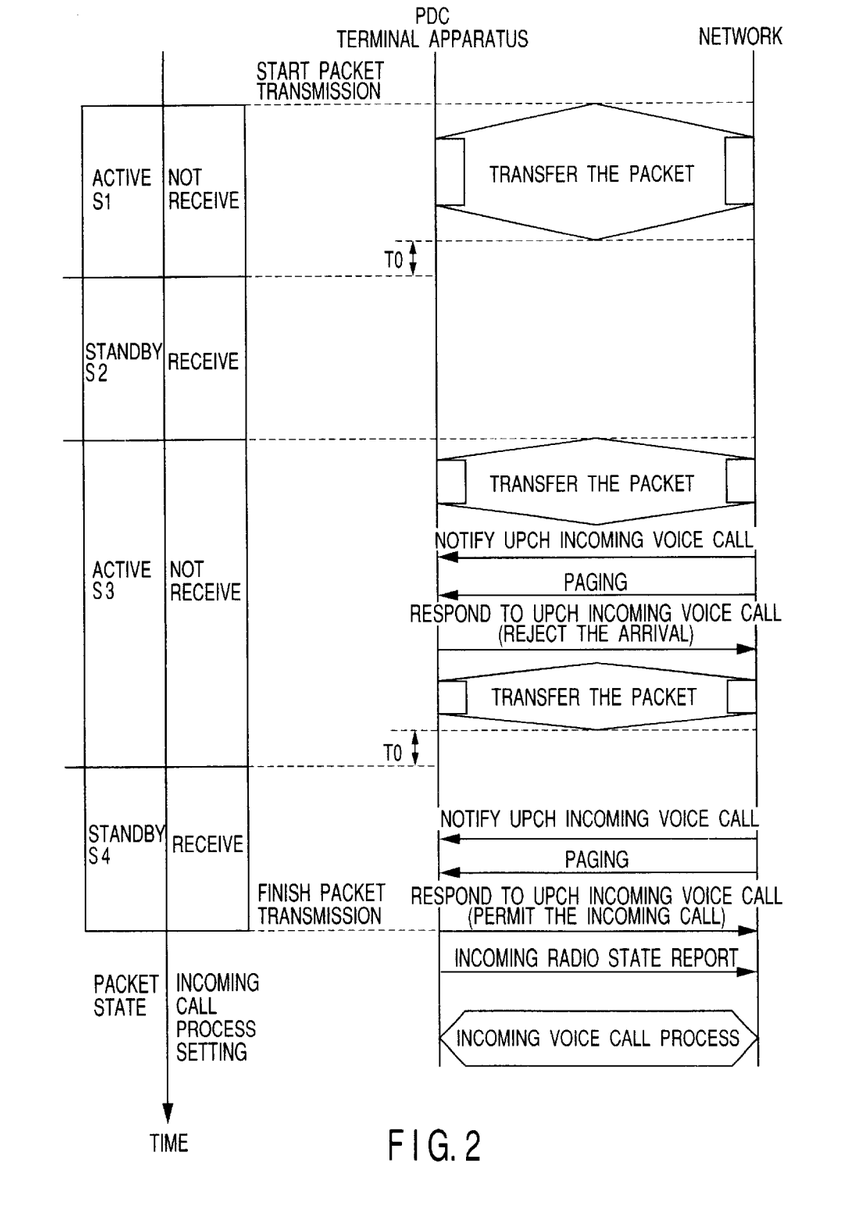
FIG. 2 is a sequence diagram of the incoming voice call control in the packet transmission in the mobile radio apparatus shown in FIG. 1.

FIG. 2 is a sequence diagram of the control operations.

The mobile radio apparatus establishes a communication link for the packet transmission with the network and becomes in the active state to transfer the packet data (S1).

Although the line for the packet transmission is held, the transfer of the packet data is finished. If the packet transfer is not further executed during the interval time T0, the active state is changed to the standby state (S2). In this state, the receiving system is switched to a system of lower power consumption.

After that, the transfer of-the packet data is restarted and the state is changed to the active state (S3). At this time, if the terminal apparatus receives UPCH incoming voice call notification and paging from the network, the incoming-call-in-packet-transmission controlling means 101 sends UPCH including the information which rejects this to the network and continues the transfer of the packet data.

After that, the transfer of the packet data is finished. If the packet transfer is not further executed during the interval time T0, the active state is changed to the standby state (S4). At this time, if the terminal apparatus receives UPCH incoming voice call notification and paging from the network, the incoming-call-in-packet-transmission controlling means 101 sends UPCH including the information which receives this to the network, finishes the packet transmission and executes the incoming voice call process.

As described above, the above-constituted mobile radio apparatus rejects the incoming voice call notification from the network, in the active state, and responds to the incoming voice call notification, in the standby state, during the packet transmission.

Thus, the mobile radio apparatus having the above constitution responds to the incoming voice call in the standby state in which the line is not substantially utilized and, therefore, the efficiency of use of the line can be improved. In addition, the mobile radio apparatus rejects the incoming voice call notification from the network in the only active state and, therefore, the transmission and reception of the packet data can be efficiently executed without interruption.

Next, the mobile radio apparatus according to the second embodiment of the present invention will be explained. The TDMA mobile radio apparatus as explained below is superficially the same as the mobile radio apparatus of the first embodiment shown in FIG. 1, and is different therefrom with respect to the only control function of the incoming-call-in-packet-transmission controlling means 101. For this reason, this control function will be mainly explained and explanations of the other structures will be omitted.

Figure 3:
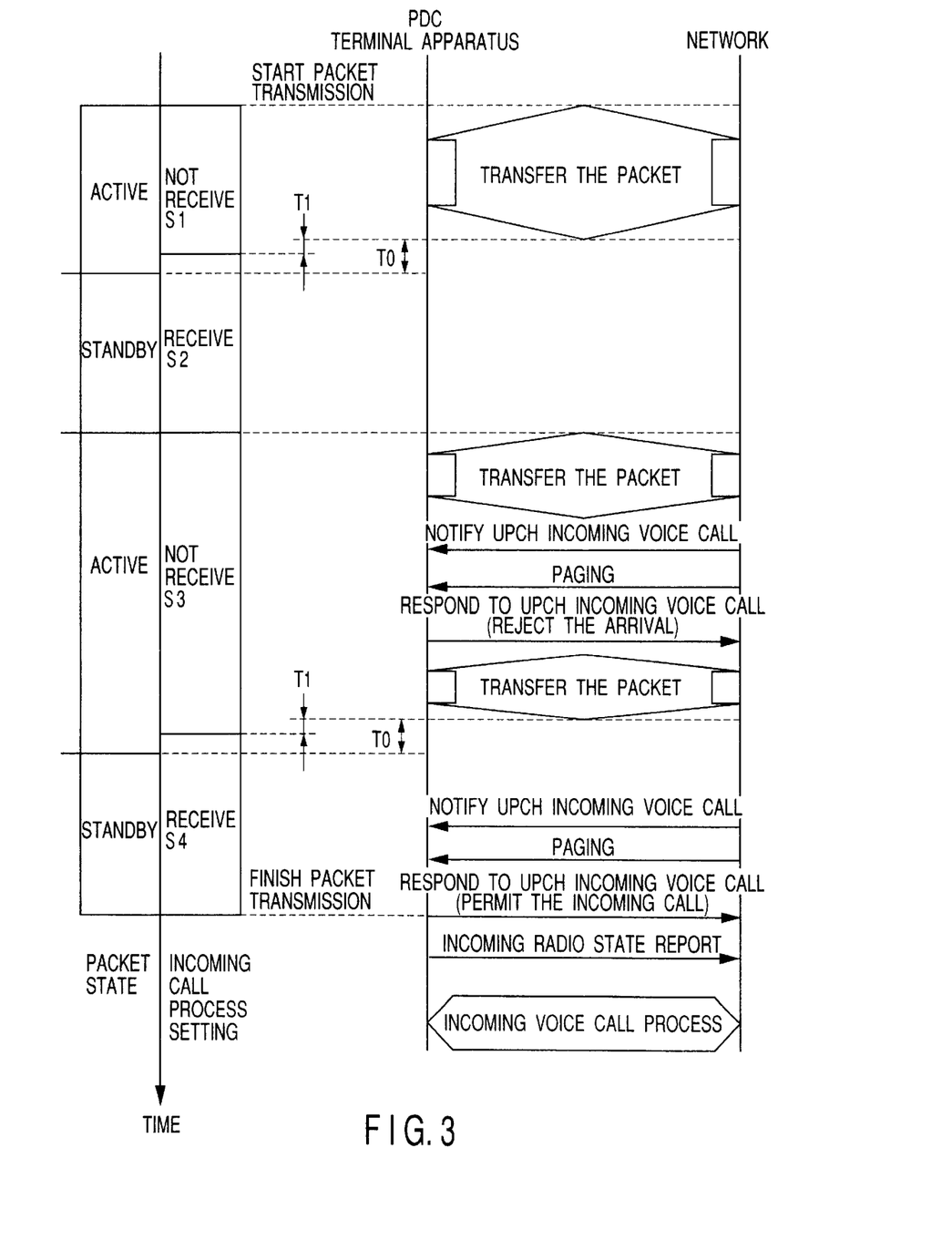
FIG. 3 is a sequence diagram of the incoming voice call control in the packet transmission in a mobile radio apparatus according to a second embodiment.

In the mobile radio apparatus according to the second embodiment, under the condition that the line for the packet transmission is held, if there is incoming voice call notification from the network in the period in which the packet data is actually transmitted and received and in the period in which the discrimination timer of the control unit 100 finishes counting the state of executing no packet transfer after the data transmission and reception has finished, in the active state, the incoming-call-in-packet-transmission controlling means 101 makes a response of rejecting the incoming voice call notification. On the other hand, if there is incoming voice call notification from the network, in the active state after the time T1 of the discrimination timer has passed, and in the standby state, the incoming-call-in-packet-transmission controlling means 101 makes a response of receiving the incoming voice call notification. The time T1 is set to be shorter than the time T0. Next, an example of control operations in a case where the incoming voice call is received during the packet transmission, in the mobile radio apparatus according to the second embodiment of the present invention, will be explained. The control operations are executed by the incoming-call-in-packet-transmission controlling means 101. FIG. 3 shows a sequence of the operations.

The mobile radio apparatus establishes a communication link for the packet transmission with the network and transfers the packet data. After the packet transfer has finished, the discrimination timer counts time T1 and the standby shifting timer counts time T0 under the condition that the packet transfer is not executed.

If the UPCH incoming voice call notification is transmitted from the network in both the period from the start of the packet transfer to the end thereof and the period from the end of the packet transfer to the time when the discrimination timer finishes counting time T1 (S1), the incoming-call-in-packet-transmission controlling means 101 rejects the notification.

After that, the standby shifting timer counts interval time T0 after the end of the packet transfer, and the active state is shifted to the standby state while the line for packet transmission is held. In this state, the receiving system is switched to a system of low power consumption.

If there is the UPCH incoming voice call notification from the network in both the active state (T0–T1) in which the discrimination timer has finished counting time T1 and the standby state (S2), the incoming-call-in-packet-transmission controlling means 101 makes a response to the notification. subsequently, the transfer of the packet data is restarted and the standby state is shifted to the active state. The discrimination timer counts time T1 and the standby shifting timer counts interval time T0 under the condition that the packet transfer is not executed.

When the terminal apparatus receives the UPCH incoming voice call notification and the paging from the network in a period (S3) from the restart of the active state to the time when the discrimination timer starts counting time T1, the incoming-call-in-packet-transmission controlling means 101 sends the UPCH including the information rejecting the reception and continues the transfer of the packet data.

After that, the standby shifting timer counts predetermined interval time T0 after the end of the packet transfer, and the active state is shifted to the standby state while the line for the packet transmission is held. In this state, the receiving system is changed to a system of low power consumption.

If there is the UPCH incoming voice call notification from the network in both the active state (T0–T1) in which the discrimination timer has finished counting time T1 and the standby state (S4), the incoming-call-in-packet-transmission controlling means 101 sends UPCH including the information which receives this and a radio state report to the network, finishes the packet transmission and executes the incoming voice call process.

As described above, the above-constituted mobile radio apparatus, in the packet transmission, rejects the incoming voice call notification from the network at the packet transfer and at time T1 after the packet transfer, and makes a response to the incoming voice call notification after time T1 after the packet transfer and in the standby state.

Thus, the mobile radio apparatus having the above constitution makes a response to the incoming voice call at time T1 after the packet transfer and at the standby time at which the line is not substantially utilized and, therefore, the efficiency of use of the line can be improved. In addition, the mobile radio apparatus rejects the incoming voice call notification from the network only at the packet transfer and at time T1 after the packet transfer and, therefore, the transmission and reception of the packet data can be efficiently executed without interruption.

In addition, the terminal apparatus can makes a response to the incoming voice call in period T0–T1 in which the packet transfer is not executed immediately before the standby time as compared with the first embodiment and, therefore, the efficiency of use of the line can be improved.

Next, the mobile radio apparatus according to the third embodiment of the present invention will be explained. The TDMA mobile radio apparatus as explained below is superficially the same as the mobile radio apparatus of the first embodiment shown in FIG. 1, and is different therefrom with-respect to the only control function of the incoming-call-in-packet-transmission controlling means 101. For this reason, this control function will be mainly explained and explanations of the other structures will be omitted.

In the mobile radio apparatus of the third embodiment, the incoming-call-in-packet-transmission controlling means 101 detects the total amount of the packet data that is to be transferred. If the size of the data which has been transferred is smaller than a preset value (hereinafter called a discrimination threshold value) as compared with the total amount of the packet data which is to be transferred when the incoming voice call is received under the condition that the line for the packet transmission is held and the packet transmission is started, the incoming-call-in-packet-transmission controlling means 101 makes a response of receiving the incoming voice call. On the other hand, if the size of the data is equal to or larger than the discrimination threshold value, the incoming-call-in-packet-transmission controlling means 101 makes a response of rejecting the incoming voice call.

Next, the operations of the above-constituted mobile radio apparatus will be explained below. The incoming and outgoing call for the voice communication and packet transmission is the same operation as that of the prior art, and its explanation is omitted.

Particularly, an example of control operations in a case where the incoming voice call is received during the packet transmission, as executed by the incoming-call-in-packet-transmission controlling means 101, will be explained. The discrimination threshold value is set at 30% in the following explanation.

Figure 4:
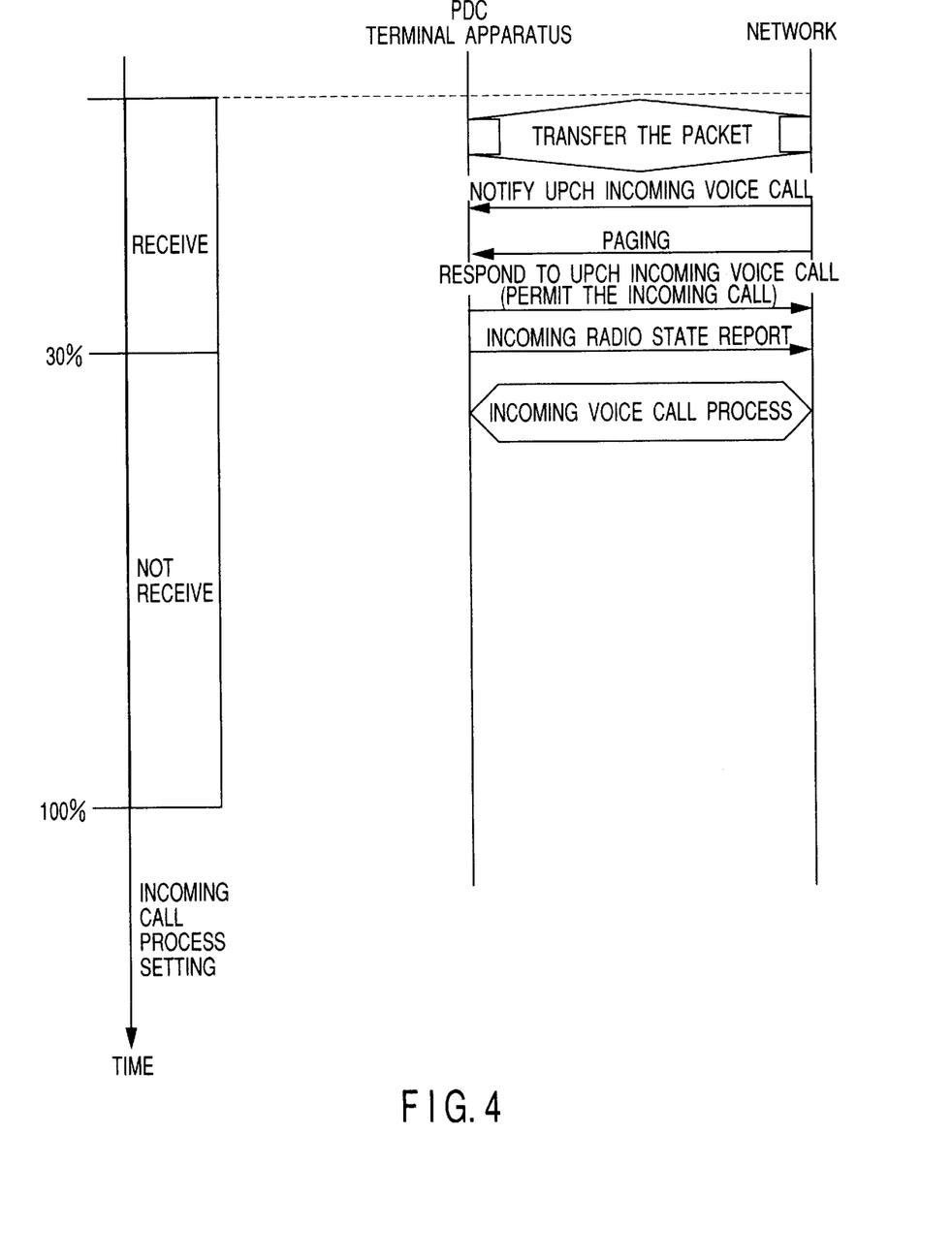
FIG. 4 is a sequence diagram of the incoming voice call control in the packet transmission in a mobile radio apparatus according to a third embodiment.

First, the incoming voice call control operations in a case where the size of the data which has been already transferred is smaller than 30% of the discrimination threshold value as compared with the total amount of the data which is to be transferred, will be explained with reference to FIG. 4.

The mobile radio apparatus establishes the communication link for the packet transmission with the network and detects the total amount of the data which is to be transferred, and the transfer of the packet data is thereby started. In receiving the data, the terminal apparatus receives the notification of the total amount from the network.

After that, the terminal apparatus counts the size of the data which has been already transferred as the transfer of the packet data proceeds. When the size of the data which has been already transferred is smaller than 30% of the discrimination threshold value as compared with the total amount of the data which is to be transferred, if the terminal apparatus receives the UPCH incoming voice call notification and the paging from the network, the incoming-call-in-packet-transmission controlling means 101 sends the UPCH including the information which receives the incoming call and the radio state report to the network, finishes the packet transmission, and executes the incoming voice call process.

Figure 5:
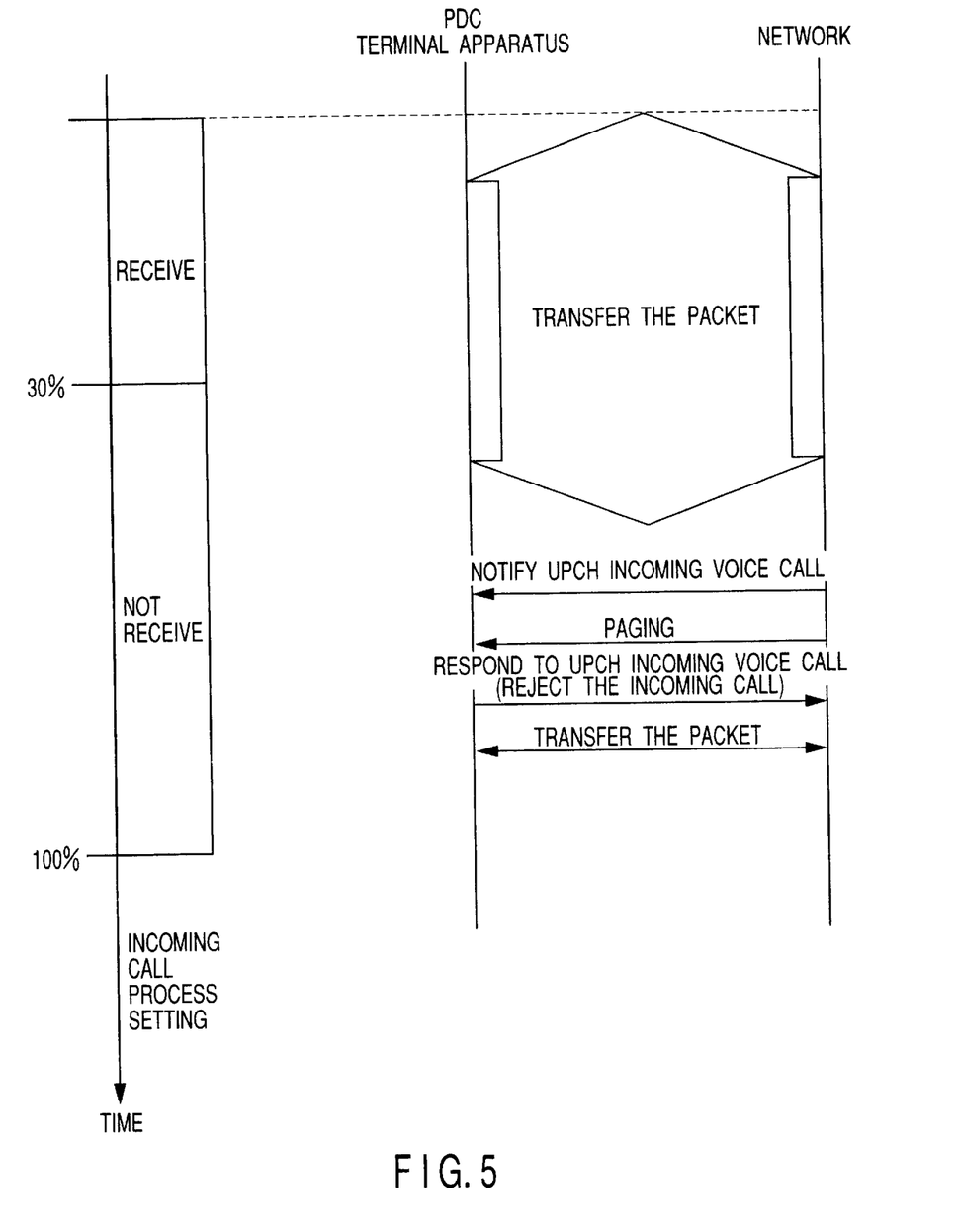
FIG. 5 is a sequence diagram of the incoming voice call control in the packet transmission in a mobile radio apparatus according to a fourth embodiment.

Next, the incoming voice call control operations in a case where the size of the data which has been already transferred is equal to or larger than 30% of the discrimination threshold value as compared with the total amount of the data which is to be transferred, will be explained with reference to FIG. 5.

The mobile radio apparatus establishes the communication link for the packet transmission with the network and detects the total amount of the data which is to be transferred, and the transfer of the packet data is thereby started. In receiving the data, the terminal apparatus receives the notification of the total amount from the network.

After that, the terminal apparatus counts the size of the data that has been already transferred as the transfer of the packet data proceeds. When the size of the data which has been already transferred is equal to or larger than 30% of the discrimination threshold value as compared with the total amount of the data which is to be transferred, if the terminal apparatus receives the UPCH incoming voice call notification and the paging from the network, the incoming-call-in-packet-transmission controlling means 101 sends the UPCH including the information which rejects the incoming call to the network and continues the transfer of the packet data.

As described above, in the above-constituted mobile radio apparatus, when the incoming voice call is received during the packet transmission, if the size of the data which has been transferred is smaller than a preset value (a discrimination threshold value) as compared with the total amount of the packet data which is to be transferred, the incoming-call-in-packet-transmission controlling means 101 makes a response of receiving the incoming voice call. On the other hand, if the size of the data is equal to or larger than the discrimination threshold value, the incoming-call-in-packet-transmission controlling means 101 makes a response of rejecting the incoming voice call.

Thus, the mobile radio apparatus having the above constitution responds to the incoming voice call from the network at the initial stage of the start of the packet transmission, and rejects the incoming voice call when the packet transmission proceeds to some extent. Therefore, a response can be made to the incoming voice call by considering the efficiency in the packet transmission.

Next, the mobile radio apparatus according to the fourth embodiment of the present invention will be explained. The TDMA mobile radio apparatus as explained below is superficially the same as the mobile radio apparatus of the first embodiment shown in FIG. 1, and is different therefrom with respect to the only control function of the incoming-call-in-packet-transmission controlling means 101. For this reason, this control function will be mainly explained and explanations of the other structures will be omitted.

In the mobile radio apparatus of the fourth embodiment, the information determining whether a response to the incoming voice call should be made or not is preset for each communication protocol in the memory unit 60, and thereby the incoming-call-in-packet-transmission controlling means 101 receives or rejects the incoming voice call in the packet transmission in accordance with the setting of the information corresponding to the utilized communication protocol.

Figure 6:
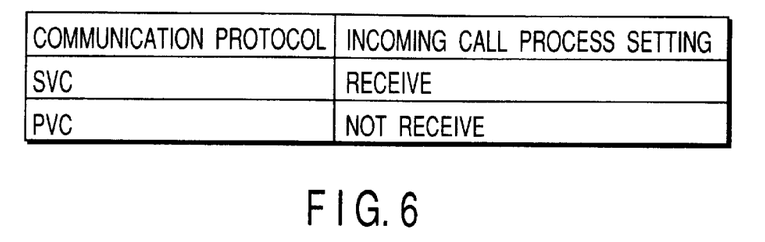
FIG. 6 is a table of incoming call process setting information stored in a memory unit of a mobile radio apparatus according to a fifth embodiment.

In the mobile radio apparatus having the above constitution, the memory unit 60 stores the information "RECEIVE" corresponding to the protocol for SVC (packet transmission of selective virtual circuit connection) and the information "NOT RECEIVE" corresponding to the protocol for PVC (mobile packet transmission), as shown in FIG. 6.

First, the mobile radio apparatus establishes the communication link for the packet transmission with the network and starts the transfer of the packet data. At this time, the utilized protocol is stored in the memory unit 60 on the basis of the result of negotiation with the network.

After that, when the terminal apparatus receives the UPCH incoming voice call notification and the paging from the network during the packet transmission of the SVC, the incoming-call-in-packet-transmission controlling means 101 sends the UPCH including the information which receives the incoming voice call and the radio state report to the network, finishes the packet transmission and executes the incoming voice call process.

On the other hand, when the terminal apparatus receives the UPCH incoming voice call notification and the paging from the network during the packet transmission of the PVC, the incoming-call-in-packet-transmission controlling means 101 sends the UPCH including the information which rejects the incoming voice call to the network and continues the packet transmission.

As described above, in the above-constituted mobile radio apparatus, the information determining whether a response to the incoming voice call should be made or not is preset for each communication protocol in the memory unit 60, and thereby the incoming voice call in the packet transmission is received or rejected in accordance with the setting of the information corresponding to the utilized communication protocol.

According to the constituted mobile radio apparatus having the above constitution, it can be set to receive or reject the incoming voice call in accordance with the communication protocol, during the packet communication.

Next, the mobile radio apparatus according to the fifth embodiment of the present invention will be explained. The TDMA mobile radio apparatus as explained below is superficially the same as the mobile radio apparatus of the first embodiment shown in FIG. 1, and is different therefrom with respect to the only control function of the incoming-call-in-packet-transmission controlling means 101. For this reason, this control function will be mainly explained and explanations of the other structures will be omitted.

In the mobile radio apparatus according to the fifth embodiment, the SVC (packet transmission of selective virtual circuit connection) is executed as the packet transmission. The memory unit 60 stores the information "RECEIVE" or "NOT RECEIVE" about the incoming voice call in accordance with the number of selectively simultaneous virtual circuit connection, as the incoming call process setting information. The incoming-call-in-packet-transmission controlling means 101 counts the number of selectively simultaneous virtual circuit connection, compares the result of the count with the incoming call process setting information, and receives or rejects the incoming voice call during the packet transmission.

Figure 7:
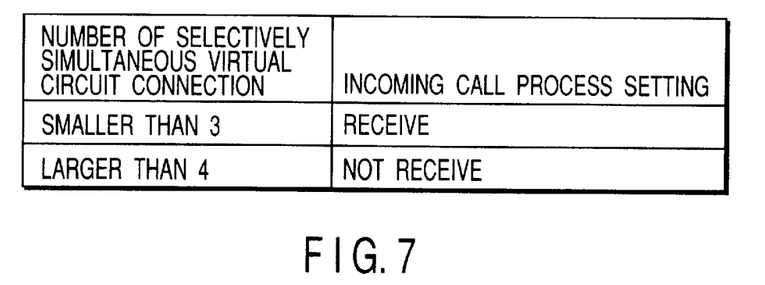
FIG. 7 is a table of incoming call process setting information stored in a memory unit of a mobile radio apparatus according to a sixth embodiment.

In the above-constituted apparatus, the memory unit 60 stores the information "RECEIVE" about the incoming voice call if the number of selectively simultaneous virtual circuit connection is equal to or smaller than "3" or "NOT RECEIVE" about the incoming voice call if the number of selectively simultaneous virtual circuit connection is equal to or larger than "4" as the incoming call process setting information as shown in FIG. 7.

The incoming-call-in-packet-transmission controlling means 101 increments the number of connection every time it executes the virtual circuit connection processing or decrements it every time it executes the virtual circuit disconnection processing to count the number of selectively simultaneous virtual circuit connection. The incoming-call-in-packet-transmission controlling means 101 stores the result of the count in the memory unit 60.

If the incoming voice call is received during the packet transmission, the incoming-call-in-packet-transmission controlling means 101 compares the result of the count stored in the memory unit 60 with the incoming call process setting information shown in FIG. 7. If the number of selectively simultaneous virtual circuit connection is equal to or smaller than 11311, the incoming-call-in-packet-transmission controlling means 101 sends the UPCH including the information that receives the incoming voice call and the radio state report to the network, finishes the packet transmission and the executes the incoming voice call process.

If the number of selectively simultaneous virtual circuit connection is equal to or larger than "4", the incoming-call-in-packet-transmission controlling means 101 sends the UPCH including the information that rejects the incoming voice call to the network and continues the packet transmission.

As described above, in the above-constituted mobile radio apparatus, the number of selectively simultaneous virtual circuit connection is counted, and the incoming voice call is received or rejected in accordance with the result of the count.

Thus, according to the mobile radio apparatus having the above constitution, the incoming voice call can be received or rejected in accordance with the number of selectively simultaneous virtual circuit connection when the packet transmission is executed.

Next, the mobile radio apparatus according to the sixth embodiment of the present invention will be explained. The TDMA mobile radio apparatus as explained below is superficially the same as the mobile radio apparatus of the first embodiment shown in FIG. 1, and is different therefrom with respect to the only control function of the incoming-call-in-packet-transmission controlling means 101. For this reason, this control function will be mainly explained and explanations of the other structures will be omitted.

In the mobile radio apparatus of the sixth embodiment, the memory unit 60 presets the information determining whether a response to the incoming voice call should be made or not is preset for each connection destination that is a partner of the packet transmission, as the incoming call process setting information, and thereby the incoming-call-in-packet-transmission controlling means 101 receives or rejects the incoming voice call in the packet transmission in accordance with the setting of the incoming call process setting information corresponding to the connection destination.

Figure 8:
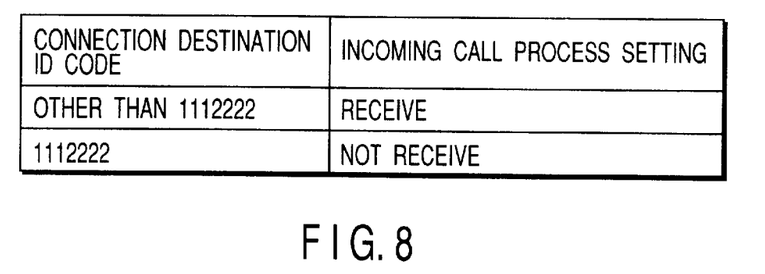
FIG. 8 is a table of incoming call process setting information stored in a memory unit of a mobile radio apparatus according to a seventh embodiment.

In the above-constituted mobile radio apparatus, the memory unit 60 stores the information "RECEIVE" corresponding to ID code "other than 1112222", of the connection destination that is a partner of the packet transmission, and the information "NOT RECEIVE" corresponding to ID code "1112222" of the connection destination, as the incoming call process setting information as shown in FIG. 8.

First, the mobile radio apparatus establishes the communication link for the packet transmission with the network and starts the transfer of the packet data. At this time, the ID code of the connection destination is stored in the memory unit 60 on the basis of the result of negotiation with the network.

After that, when the terminal apparatus receives the UPCH incoming voice call notification and the paging from the network during the packet transmission, the incoming-call-in-packet-transmission controlling means 101 compares the ID code of the connection destination that is currently connected with the incoming call process setting information.

If the ID code of the connection destination is "other than 112222", the incoming-call-in-packet-transmission controlling means 101 sends the UPCH including the information that receives the incoming voice call and the radio state report to the network, finishes the packet transmission and executes the incoming voice call process.

If the ID code of the connection destination is "1112222", the incoming-call-in-packet-transmission controlling means 101 sends the UPCH including the information that rejects the incoming voice call and the radio state report to the network and continues the packet transmission.

As described above, in the above-constituted mobile radio apparatus, the information determining whether a response to the incoming voice call should be made or not is preset for each connection destination in the memory unit 60, and thereby the incoming voice call in the packet transmission is received or rejected in accordance with the setting of the incoming call process setting information corresponding to the connection destination.

Thus, according to the mobile radio apparatus having the above constitution, when the packet transmission is executed the incoming voice call can be received or rejected in accordance with the connection destination.

Next, the mobile radio apparatus according to the seventh embodiment of the present invention will be explained. The TDMA mobile radio apparatus as explained below is superficially the same as the mobile radio apparatus of the first embodiment shown in FIG. 1, and is different therefrom with respect to the only control function of the incoming-call-in-packet-transmission controlling means 101. For this reason, this control function will be mainly explained and explanations of the other structures will be omitted.

In the mobile radio apparatus of the seventh embodiment, the memory unit 60 stores the information "RECEIVE" or "NOT RECEIVE" about the incoming voice call in accordance with the packet transmission duration as the incoming call process setting information. The incoming-call-in-packet-transmission controlling means 101 clocks the packet transmission duration, compares the result of the clocking with the incoming call process setting information, and receives or rejects the incoming voice call in the packet transmission.

Figure 9:
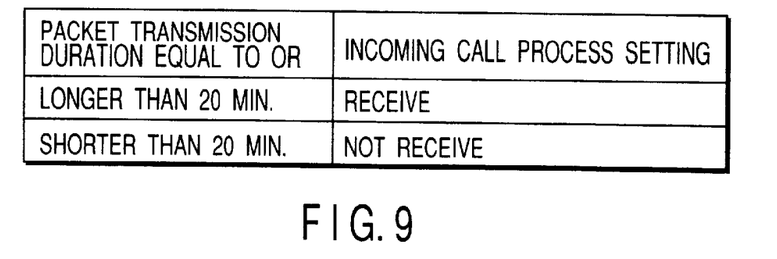
FIG. 9 is a table of incoming call process setting information stored in a memory unit of a mobile radio apparatus according to an eighth embodiment.

In the above-constituted mobile radio apparatus, the memory unit 60 stores the information "RECEIVE" about the incoming voice call if the packet transmission duration is equal to or longer than "20 minutes" or the information "NOT RECEIVE" about the incoming voice call if the packet transmission duration is shorter than "20 minutes", as the incoming call process setting information, as shown in FIG. 9.

When the packet transmission starts, the incoming-call-in-packet-transmission controlling means 101 clocks the duration of the transmission.

The incoming voice call is received during the packet transmission and the incoming-call-in-packet-transmission controlling means 101 compares the duration with the incoming call process setting information shown in FIG. 9. If the packet transmission duration is equal to or longer than "20 minutes", the incoming-call-in-packet-transmission controlling means 101 sends the UPCH including the information that receives the incoming voice call and the radio state report to the network, finishes the packet transmission and the executes the incoming voice call process.

If the packet transmission duration is shorter than "20 minutes", the incoming-call-in-packet-transmission controlling means 101 sends the UPCH including the information that rejects the incoming voice call to the network and continues the packet transmission.

As described above, in the above-constituted mobile radio apparatus, the incoming-call-in-packet-transmission controlling means 101 clocks the packet transmission duration, and receives or rejects the incoming voice call in the packet transmission in accordance with the result of the clocking.

Thus, according to the mobile radio apparatus having the above constitution, when the packet transmission is executed the incoming voice call can be received or rejected in accordance with the duration of the transmission.

The present invention is not limited to the above embodiments. The PDC mobile radio apparatus has been exemplified in the embodiments. However, the present invention can be also applied to the mobile radio apparatuses of the other communication systems.

Needless to say, the present invention can be variously modified in a range that does not exceed the gist thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile radio apparatus for establishing a communication link with a radio base station which can be connected to a network and making communications of packet data via the radio communication link, said radio apparatus comprising:

total data amount detecting means for detecting a total amount of the packet data that is to be transferred;

data amount detecting means for detecting an amount of the packet data that has been transferred, during the transfer of said packet data; and incoming call responding means, in a case where the data amount detected by said data amount detecting means is smaller than a preset rate as compared with the total data amount detected by said total data amount detecting means when an incoming voice call signal is received via said radio base station, for making a response of receiving said incoming signal.

2. A mobile radio apparatus for establishing a communication link with a radio base station which can be connected to a network and making communications of packet data via the radio communication link, said radio apparatus comprising:

total data amount detecting means for detecting a total amount of the packet data that is to be transferred;

data amount detecting means for detecting an amount of the packet data that has been transferred, during the transfer of said packet data; and incoming call responding means, in a case where the data amount detected by said data amount detecting means is equal to or larger than a preset rate as compared with the total data amount detected by said total data amount detecting means when an incoming voice call signal is received via said radio base station, for making a response of rejecting said incoming signal.

3. A mobile radio apparatus for establishing a communication link with a radio base station which can be connected to a network and making communications of packet data via the radio communication link by utilizing a communication protocol for selective virtual circuit connection packet communication, said radio apparatus comprising:

simultaneous connection detecting means for detecting number of simultaneous connection of a selective virtual circuit, during transfer of said packet data; and incoming call responding means, in a case where the number of simultaneous connection detected by said simultaneous connection detecting means is equal to or smaller than a preset number when an incoming voice call signal is received via said radio base station, for making a response of receiving said incoming signal, and in a case where the number of simultaneous connection detected by said simultaneous connection detecting means is larger than the preset number, for making a response of rejecting said incoming signal.

4. A mobile radio apparatus for establishing a communication link with a radio base station which can be connected to a network and making communications of packet data via the radio communication link, said radio apparatus comprising:

connection destination identifying means for identifying a communication partner that transfers said packet data; and incoming call responding means, in a case where the communication partner identified by said connection destination identifying means is a preset partner when an incoming voice call signal is received via said radio base station, for making a response of receiving said incoming signal, and in a case where the communication partner identified by said connection destination identifying means is a partner other than the preset partner, for making a response of rejecting said incoming signal.

5. A control circuit of a mobile radio apparatus for establishing a communication link with a radio base station which can be connected to a network and making communications of packet data via the radio communication link, said circuit comprising:

total data amount detecting means for detecting a total amount of the packet data that is to be transferred;

data amount detecting means for detecting an amount of the packet data that has been transferred, during the transfer of said packet data; and incoming call responding means, in a case where the data amount detected by said data amount detecting means is smaller than a preset rate as compared with the total data amount detected by said total data amount detecting means when an incoming voice call signal is received via said radio base station, for making a response of receiving said incoming signal.

6. A control circuit of a mobile radio apparatus for establishing a communication link with a radio base station which can be connected to a network and making communications of packet data via the radio communication link, said circuit comprising:

total data amount detecting means for detecting a total amount of the packet data that is to be transferred;

data amount detecting means for detecting an amount of the packet data that sin has been transferred, during the transfer of said packet data; and incoming call responding means, in a case where the data amount detected by said data amount detecting means is equal to or larger than a preset rate as compared with the total data amount detected by said total data amount detecting means when an incoming voice call signal is received via said radio base station, for making a response of rejecting said incoming signal.

7. A control circuit of a mobile radio apparatus for establishing a communication link with a radio base station which can be connected to a network and making communications of packet data via the radio communication link by utilizing a communication protocol for selective virtual circuit connection packet communication, said circuit comprising:

simultaneous connection detecting means for detecting number of simultaneous connection of a selective virtual circuit, during transfer of said packet data; and     incoming call responding means, in a case where the number of simultaneous connection detected by said simultaneous connection detecting means is equal to or smaller than a preset number when an incoming voice call signal is received via said radio base station, for making a response of receiving said incoming signal, and in a case where the number of simultaneous connection detected by said simultaneous connection detecting means is larger than the preset number, for making a response of rejecting said incoming signal.

8. A control circuit of a mobile radio apparatus for establishing a communication link with a radio base station which can be connected to a network and making communications of packet data via the radio communication link, said circuit comprising:

connection destination identifying means for identifying a communication partner that transfers said packet data; and     incoming call responding means, in a case where the communication partner identified by said connection destination identifying means is a preset partner when an incoming voice call signal is received via said radio base station, for making a response of receiving said incoming signal, and in a case where the communication partner identified by said connection destination identifying means is a partner other than the preset partner, for making a response of rejecting said incoming signal.

\* \* \* \* \*

UNITED STATES PATENT AND TRADEMARK OFFICE
CERTIFICATE OF CORRECTION

PATENT NO. : 6,658,266 B1
DATED : December 2, 2003
INVENTOR(S) : Inokura et al.

It is certified that error appears in the above-identified patent and that said Letters Patent is hereby corrected as shown below:

<u>Column 14,</u>
Line 55, change "that sin" to -- that --.

Signed and Sealed this

Sixteenth Day of March, 2004

JON W. DUDAS
*Acting Director of the United States Patent and Trademark Office*